Jan. 5, 1954   H. W. LORMOR   2,664,842
BATTERY BURNING RACK
Filed Aug. 31, 1949   3 Sheets-Sheet 3

INVENTOR.
HENRY W. LORMOR
BY Hudson, Boughton,
Williams, David & Hoffmann
ATTORNEYS Patented Jan. 5, 1954

2,664,842

UNITED STATES PATENT OFFICE 2,664,842

BATTERY BURNING RACK

Henry W. Lormor, Shaker Heights, Ohio, assignor to Willard Storage Battery Company, Cleveland, Ohio, a corporation of West Virginia Application August 31, 1949, Serial No. 113,275

6 Claims. (Cl. 113—59)

The present invention relates to mechanism used in the manufacture of storage batteries for burning post straps to groups of battery plates, and more particularly, to a new and improved apparatus for holding battery plates and post straps while they are burned together.

In the manufacture of storage batteries, it is the practice to form battery plates in a cell group by burning a post strap to a plurality of closely spaced parallel plates. One form of apparatus for burning the strap posts and plates together comprises, in general, an endless conveyor including a number of battery plate racks, sometimes referred to as "burning racks," arranged to circulate in a horizontal plane. The burning racks each includes a heavy base member having two spaced, horizontal toothed bars or plates, commonly referred to as combs, fixed thereto, which combs hold the battery plates inserted between the teeth thereof in vertical position and in proper spaced relation with the plates resting on the base member. The battery plates are inserted between the teeth of the combs and the post straps are positioned and burned on the plates as the burning racks move along with the conveyor. The burning racks are often sufficiently large to support as many as ten groups of battery plates and consequently, they are quite heavy and bulky.

In forming battery plate groups for different size batteries, it is often necessary to substitute different burning racks on the endless conveyor because the size or the spacing of the plates of some batteries are different than others. This substitution of burning racks is difficult and time-consuming due to the weight and bulkiness of the racks. In addition, the storage of the racks often presented problems and, in any case, considerable space is utilized for that purpose.

A principal object of the present invention is the provision of a new and improved endless conveyor for a battery plate burning machine of the character referred to having burning racks comprising base members which may be adapted to form the conveyor or a part of the conveyor and relatively lightweight and compact battery plate holding members or comb assemblies, which plate holding members or comb assemblies may be readily attached to and detached from the base members without removing the latter from the conveyor.

Another object of the invention is the provision of a new and improved burning rack comprising a base member, a comb structure or assembly detachably connected to the base and adapted to receive battery plates between the teeth thereof and hold them in vertical position and predetermined spaced relation for support by the base member, and mechanism on the base member for adjusting the elevation of the comb structure or assembly relative to the base member to accommodate plates of different lengths.

The invention resides in certain constructions and combinations and arrangements of parts and further objects and advantages will be apparent to those skilled in the art to which it relates from the following description of the preferred embodiment described with reference to the accompanying drawings forming a part of this specification, in which Fig. 1 is a perspective front view of a battery plate burning rack embodying the present invention and having a group of battery plates therein and a post strap positioned on the plates for burning thereto;

Fig. 4 is a fragmentary end view, partly in section, of the burning rack; and

Fig. 5 is a diagrammatic view of the camming or wedging mechanism for raising and lowering the comb structures or assembly of the burning rack.

Figure 1:
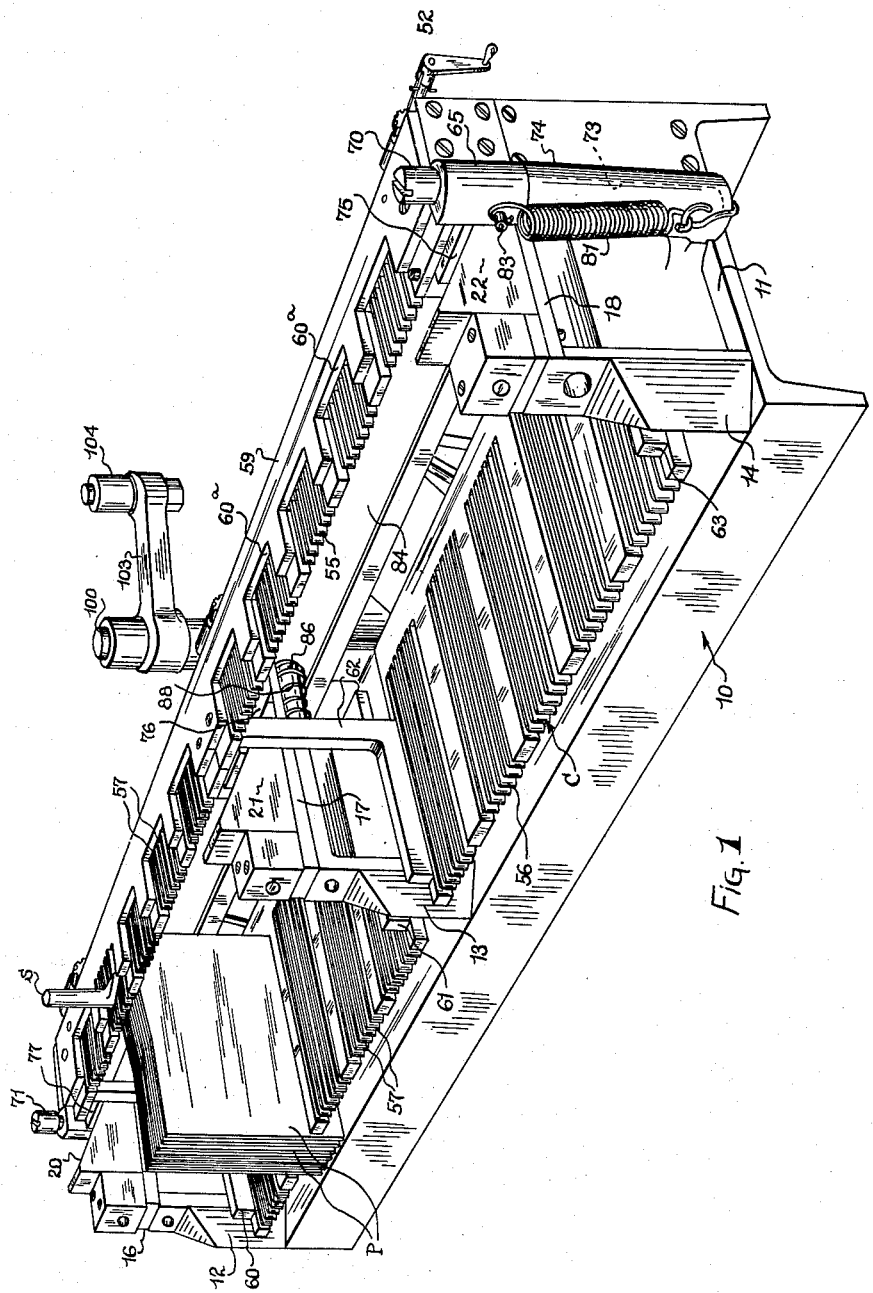
Figure 2:
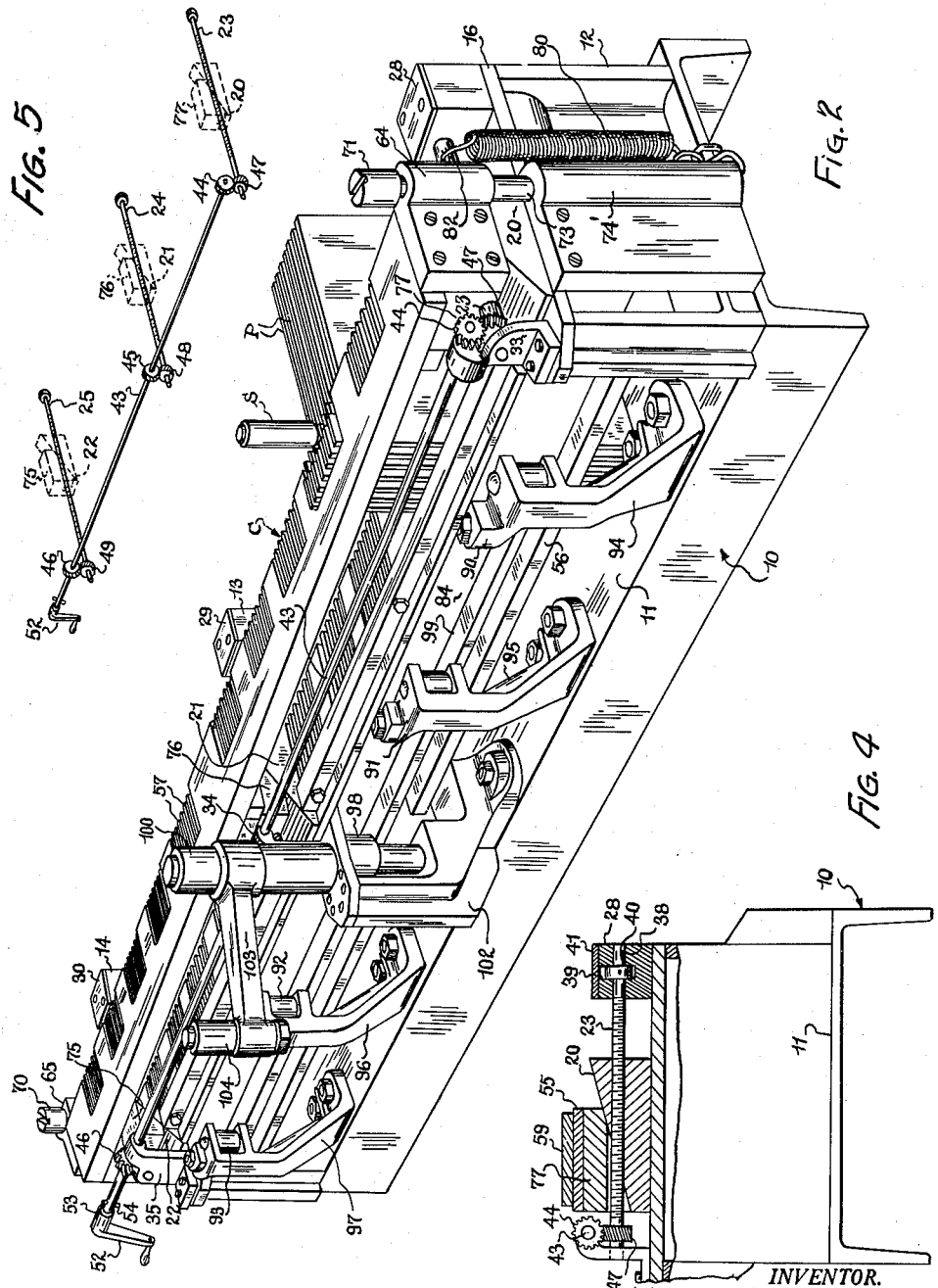
Fig. 2 is a perspective rear view of the burning rack shown in Fig. 1.
Figure 3:
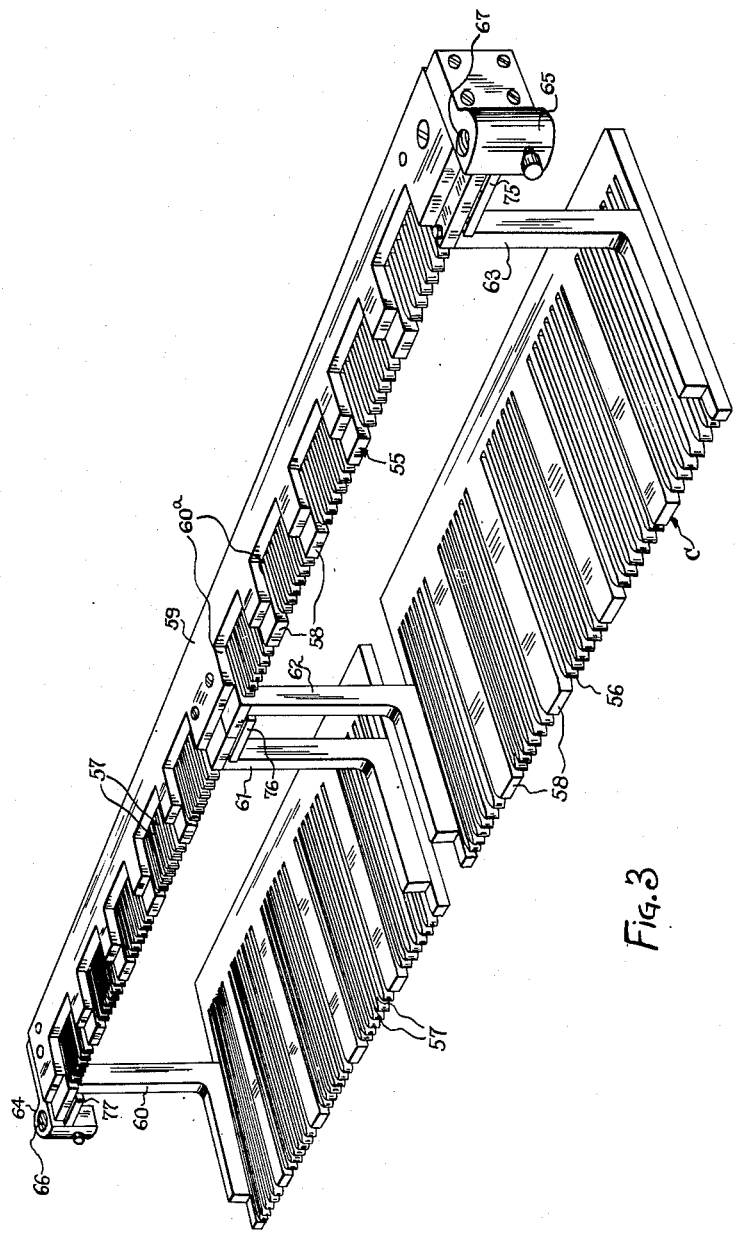
Fig. 3 is a perspective view of the comb structure or assembly of the burning rack shown in Fig. 1.

Although the burning rack of the present invention may be used in any suitable system for burning post straps to battery plates it is particularly suitable for use with battery plate burning machines of the type disclosed in U. S. Patents Nos. 1,389,155 and 1,531,753 and is herein shown and described in a form suitable for incorporation in the conveyor of such machines.

Referring to the drawings, the burning rack shown comprises a base member 10 adapted to be attached to and form a part, for example, one link of a horizontal endless conveyor, not shown. The base member 10 comprises a relatively heavy inverted channel member having a surface 11 adapted to support battery plates P endwise thereon, which plates are held on end by a comb structure or assembly C. Preferably, the base member has three transverse vertical wall sections 12, 13 and 14, two of which are at opposite ends of the base member and the third adjacent to the central portion thereof. Each wall section 12, 13 and 14 has a top surface or plate 16, 17, 18 on which wedge shape camming blocks 20, 21 and 22 slide.

The camming blocks 20, 21, 22 are adapted to be moved in unison along their respective top plates 16, 17, 18 by threaded rods 23, 24, 25 which engage in tapped holes in the wedges and are rotatably journalled at their forward ends in gudgeons 28, 29, 30. The rear ends of the rods 23, 24, 25 are journalled in brackets 33, 34, 35, respectively. To prevent longituidnal movement of the rods 23, 24, 25, the gudgeons 28, 29, 30 are recessed as at 39 in Fig. 4 and a stop collar 40 is pinned to each rod. The collars cooperate with the sides of the recesses in the blocks and prevent endwise movement of the rods.

The threaded rods 23, 24, 25 are adapted to be rotated in unison by a crank operated shaft 43 journalled in the brackets 33, 34, 35 and provided with helical gears 44, 45, 46 attached thereto and continuously in mesh with helical gears 47, 48, 49, respectively, which latter gears are attached on the respective rods 23, 24, 25. The shaft 43 is rotated by a hand crank 52 which may be clutched and declutched with the shaft by axial movement of the crank. For this purpose, the crank 52 has limited sliding movement on the shaft 43 and the crank hub is slotted at 53 to receive driving lugs in the form of a pin 54 extending transversely through the shaft, when the crank is moved inwardly of the shaft. It will be apparent that by rotating the shaft 43, the wedge blocks 20, 21, 22 may be moved in unison forward or backward along their respective slide plates by the threaded rods.

The comb structure or assembly C comprises an upper comb 55 and a lower comb 56. The combs 55, 56 are preferably formed of metal plates having a series of slots 57 therein into which the storage battery plates P may be inserted edgewise. Preferably groups of slots of a number corresponding to the number of plates in a battery cell group are spaced by relatively wide plate segments or tines 58 so as to separate the battery plates arranged in the combs into groups. The slots 57 form teeth or tines which properly space the battery plates of each group for burning to a post strap, shown at S. As may be seen in the drawings, the upper comb 55 is considerably narrower than the lower comb 56 as the upper comb receives only the terminal lugs of the plates whereas the lower plate is substantially as wide as the battery plates. Preferably, a template 59 in the form of a plate having notched recesses 60a which register with the slotted areas of the comb plate 55 is attached to the upper surface of comb 55 to facilitate the assembly of the post straps to the battery plates and with the upper comb confines the molten metal to the juncture of the post strap and battery plate lugs.

The combs 55, 56 are connected together in vertical spaced relation by L-shaped members 60, 61, 62, 63, the top ends of which are connected to the bottom sides of the comb 55 while the feet thereof are attached to the upper side of the lower comb 56. In the particular form of the invention shown, the lower comb 56 is actually composed of two separate plates spaced from one another at the central portion thereof to make way for the central wall structure 13 of the base member 10. The two plates forming the lower comb, however, function as a unit and are therefore referred to as a single comb.

The comb assembly C has lugs 64, 65 at opposite ends, provided with threaded openings 66, 67 extending therethrough into which the upper threaded ends of vertical shafts 70, 71 are received for attaching the shafts to the comb assembly. The lower ends of the shafts 70, 71 which are smooth project through bores 72, 73 in the base 10 and have sliding engagement therewith. It will be seen that by this arrangement, the shafts 70, 71 maintain the comb assembly in vertical alignment with the base member throughout considerable vertical movement of the assembly relative to the base. The comb assembly C has camming blocks 75, 76, 77 attached to the underside of the comb plate 55, which blocks have bottom surfaces complementary to the upper surfaces of the camming blocks 20, 21, 22 upon which they rest. It is apparent that by moving the wedge blocks 20, 21, 22 as described hereinbefore, the comb structure is cammed vertically. Preferably, the comb structure is maintained in engagement with the wedge blocks 20, 21, 22 by springs 80, 81, the upper ends of which are attached to the lugs 64, 65 by being hooked over pins 82, 83 projecting from the respective lugs, while their opposite ends are attached to the projections 74, 74'.

It will be apparent that the comb structure or assembly C can be lifted from the base member 10 merely by unhooking the springs 80, 81 from pins 82, 83. Thus, where it is necessary to use combs having different numbers of tines or slots or different spacing therebetween to accommodate battery plate groups of different from, different comb structures or assemblies can be readily substituted on the base member. The comb assemblies are relatively light and compact so that they may be easily handled and conveniently stored when not in use.

In the present form of the invention, mechanism is provided on the base member 10 for automatically ejecting the battery plates from the burning racks or comb structure after the post straps have been burnt thereto, as shown, this mechanism comprises a bar 84 supported by pins, one of which may be seen at 86, which project from the forward surface of the bar and into openings in the wall sections 12, 13, 14, respectively. Compression springs, one of which may be seen at 88, carried on the pins which support bar 84, are interposed between the bar 84 and wall structures 12, 13, 14, and urge the bar 84 rearwardly, as viewed in Fig. 1. The bar 84 is adapted to be moved forwardly to eject the battery plate cell groups by arms 90, 91, 92, 93, pivoted at one end to brackets 94, 95, 96, 97, respectively, and an arm 98 keyed to a crankshaft 100. The opposite ends of the arms 90, 91, 92, 93, 98 carry rollers which engage the bar 84 to substantially eliminate friction between the arms and the bar. The arms are moved in unison by a link 99 which interconnects the arms. The crankshaft 100 is journalled in a bracket 102 attached to the base 10 and the upper end thereof has a crank 103 provided with a roller 104 adapted to engage a cam member (not shown) alongside the conveyor path to oscillate the shaft 100 as the burning rack passes the unloading section of the conveyor.

It will be seen that the plate ejector mechanism is independent of the comb structure C and that various comb structures may be attached to the base 10 without disturbing or interfering with the ejector mechanism.

By the present invention, the relatively heavy, bulky base member 10 and the ejector mechanism need not be removed from the conveyor proper of the post strap plate burning machine when it is desired to utilize different comb structures, as the comb structures or assemblies may be easily removed and replaced. Adjustment of the vertical positions of the comb structures relative to the base member may be readily effected by operating the crank 52.

From the foregoing it will be seen that the objects heretofore enumerated and others have been accomplished and that there has been provided a new and improved battery plate rack having readily detachable comb structures and mechanism for adjusting the comb structures relative to the base member. The construction of the burning rack is relatively simple and yet it is rugged and will withstand the heat of the plate burning flames without adversely affecting the various parts thereof, including the comb adjusting mechanism.

Although only the preferred embodiment of the invention has been described, other forms and modifications could be employed. One such modification could reside in mechanism for rotating the threaded cam actuating rods 23, 24, 25 and could comprise a crank-operated wrench structure having a plurality of unitarily driven rod turning elements adapted to be drivingly engaged with the ends of the threaded rods and disengaged by removal of the wrench from the rack. As previously indicated, while the preferred embodiment of the invention has been described in considerable detail, the invention is not limited to the constructions described and it is my intention to hereby cover all adaptations, modifications and uses thereof which come within the practice of those skilled in the art to which the invention relates and the scope of the appended claims.

Having thus described my invention, I claim:

1. A storage battery plate rack comprising a base having a surface adapted to support a plurality of battery plates, a unitary member comprising two tiered combs arranged in spaced relation with one another and supported above said surface and adapted to hold battery plates edgewise for support by said surface, means detachably supporting said member in operative relation to said base and for relative movement with respect thereto, and mechanism carried by said base for raising and lowering said member relative to said base.

2. A storage battery plate rack comprising, a base member having a surface adapted to support a series of battery plates thereon edgewise, a plate holding unit comprising a pair of spaced toothed members arranged in tiers with the teeth of one of said members in registration with the teeth of the other and adapted to receive individual battery plates edgewise between the respective registered teeth, guide means on said base member and unit adjacent to opposite ends thereof and operative to guide said unit for movement toward and from said base member and permitting said unit to be detached from said base member, means adjacent to opposite ends of said rack to adjustably position said unit guide means along said base member guide means, and means carried by the base member for simultaneously actuating each of the last named means.

3. A storage battery plate rack comprising, a base member having a surface adapted to support a series of battery plates thereon edgewise, a detachable plate holding unit comprising a pair of spaced toothed members arranged in tiers with the teeth of one of said members in registration with the teeth of the other and adapted to receive individual battery plates edgewise between the respective registered teeth, guide means on said base member and unit adjacent to opposite ends thereof and operative to guide said unit for movement toward and from said base member, said guide means each comprising a rod-like element and an element having a slideway to slidingly receive the first named element, whereby said unit may be lifted from operative relation with and detached from said base member, and means carried by said base member to adjustably position said unit along said guide means.

4. A storage battery plate rack comprising, a base member having a surface adapted to support a series of battery plates edgewise thereon, a detachable plate holding unit comprising a pair of toothed members arranged in spaced relation with one another and disposed in tiers with the teeth of one of said members in registration with the teeth of the other, the toothed members of said unit being arranged in spaced relation with one another to receive individual battery plates edgewise between the respective registered teeth, guide means on said base member and unit adjacent to opposite ends thereof and operative to detachably support said unit on said base member and to guide said unit for movement toward and from said base member along a line substantially perpendicular to said base member, said guide means each comprising a rigid elongated element and an element having a slideway to slidingly receive the first-named element, said means to adjust said unit along said guide means comprising a pair of support members at opposite ends of said unit and resting respectively on a pair of support members at opposite ends of said base member, one pair of said pairs of members comprising cams movable relative to the members engaged therewith, and mechanism on said base member to move said cams simultaneously.

5. A machine for assembling and burning battery plates into battery cell groups comprising an endless conveyor including a base member providing a plane surface for supporting battery plates edgewise, a first member having a plurality of parallel slots therein detachably supported above and parallel to said base member, a second member having a plurality of parallel slots therein detachably supported above said first member in spaced relation therewith and parallel to said base member, said first and second members comprising a battery plate holding unit, the individual slots of said members being in registry for receiving an individual battery plate edgewise in the respective registered slots, said slots in each of said members being arranged in spaced groups, each group having that number of slots corresponding to the number of battery plates constituting a battery cell group, said unit being movable along a line substantially perpendicular to said plane surface, and means carried by said base member for adjustably positioning said unit along said line.

6. A battery plate assembling and burning machine comprising a conveyor, a base member attached to said conveyor and providing a plane surface for supporting battery plates edgewise, a unitary member comprising two spaced tiered combs detachably supported on said base member above said surface, the teeth of said combs being in registry and adapted to hold individual battery plates edgewise on said surface between the respective registered teeth of the combs, said unitary member being capable of relative movement with respect to said base member along a line substantially perpendicular to said base member, and mechanism for adjustably positioning said unitary member along said line, said mechanism comprising cams carried by said base and cams carried by said unitary member, said cams on said base member having surfaces complementary to said cams on said unitary member and adapted to cooperate therewith, a means carried by said base member for causing simultaneous relative movement of the cooperating cams.

HENRY W. LORMOR.

References Cited in the file of this patent

UNITED STATES PATENTS

| Number | Name | Date |
|---|---|---|
| 871,393 | Flanders | Nov. 19, 1907 |
| 1,389,155 | Norris | Aug. 30, 1921 |
| 1,396,162 | Campbell | Nov. 8, 1921 |
| 1,410,716 | Peers | Mar. 28, 1922 |
| 1,531,753 | Norris | Mar. 31, 1925 |
| 1,715,020 | Von Grimmenstein | May 28, 1929 |
| 1,881,761 | Lougheed | Oct. 11, 1932 |
| 2,269,754 | Bernhardt | Jan. 13, 1942 |
| 2,498,725 | Thornburg | Feb. 28, 1950 |